Patented Feb. 9, 1932

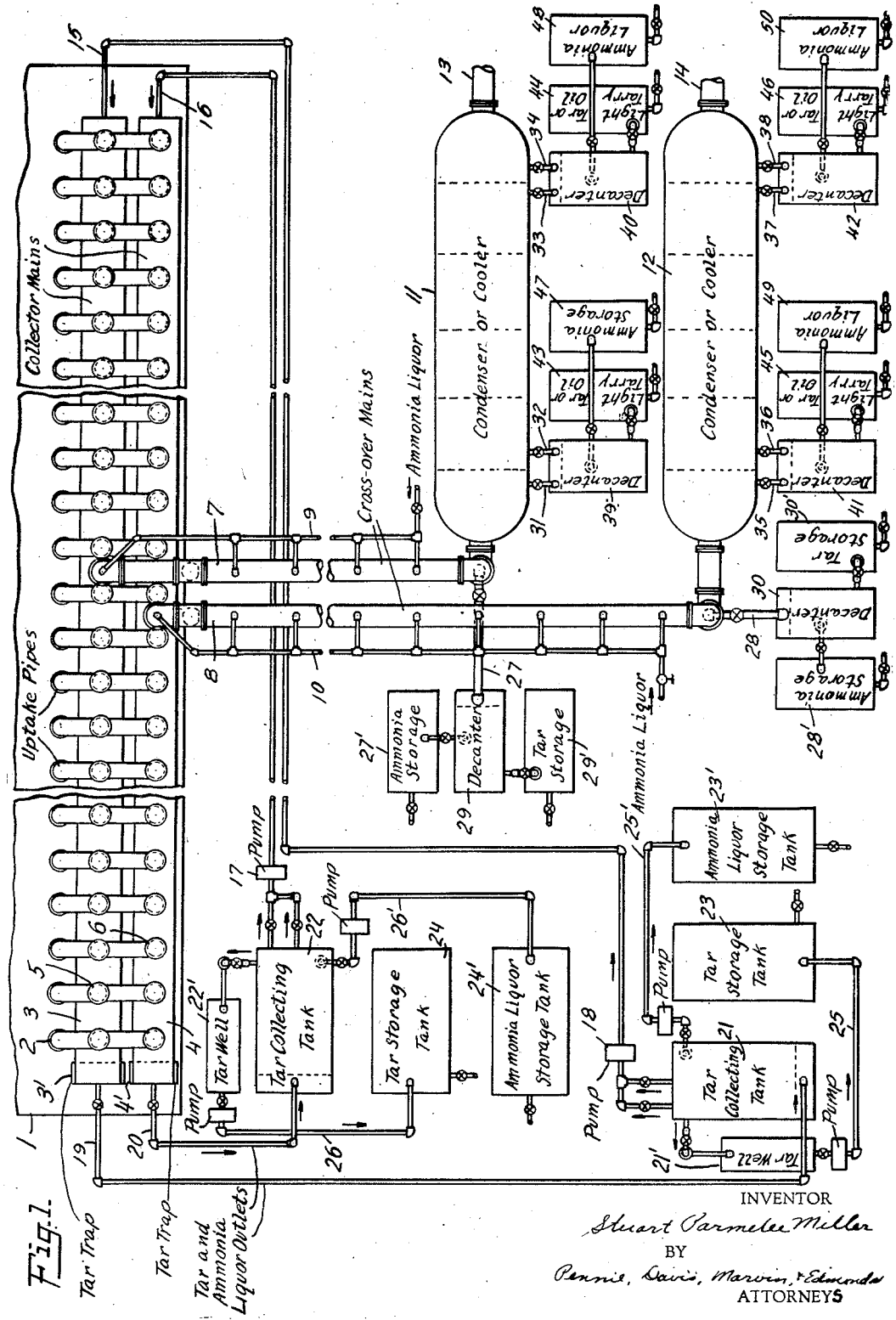

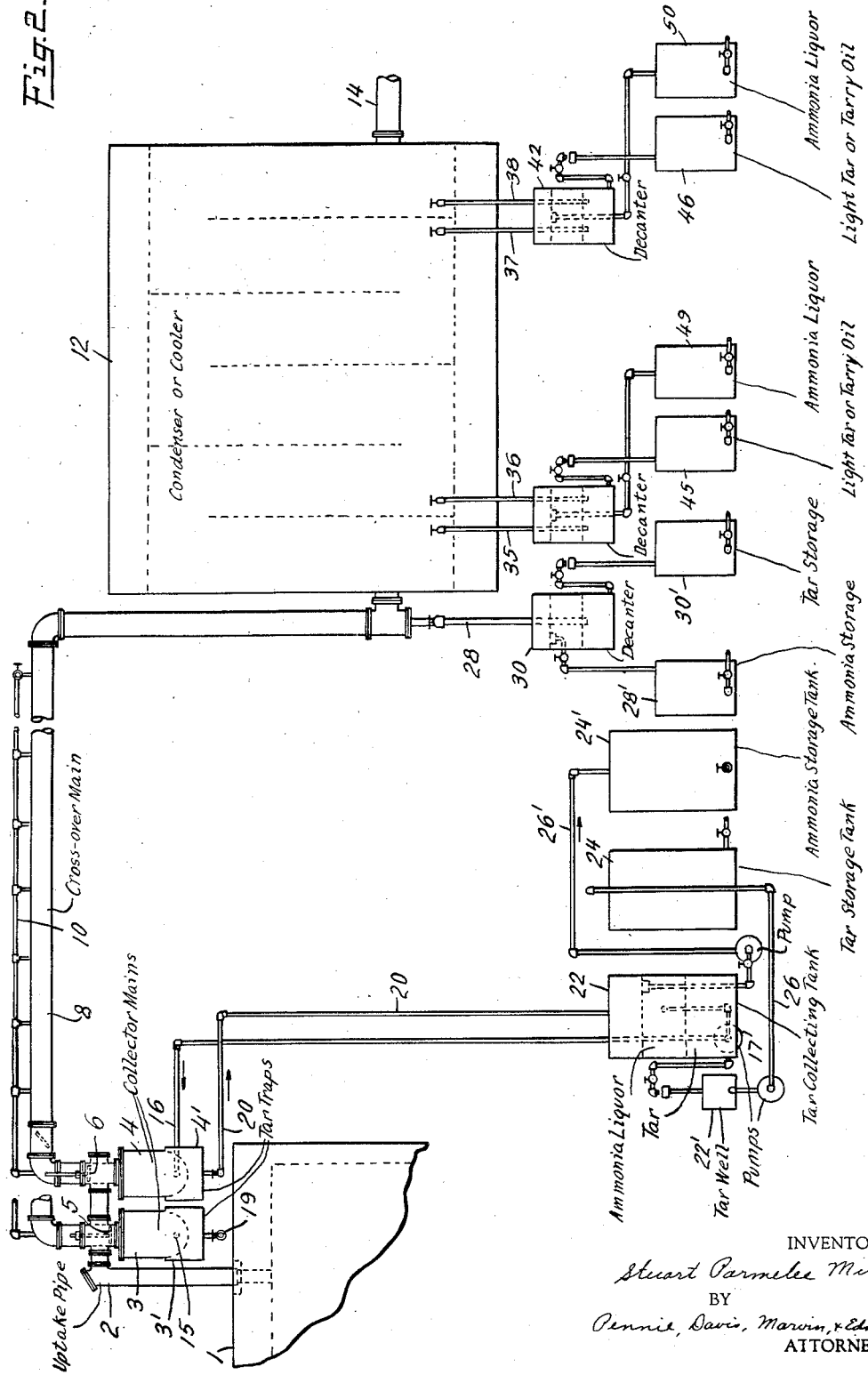

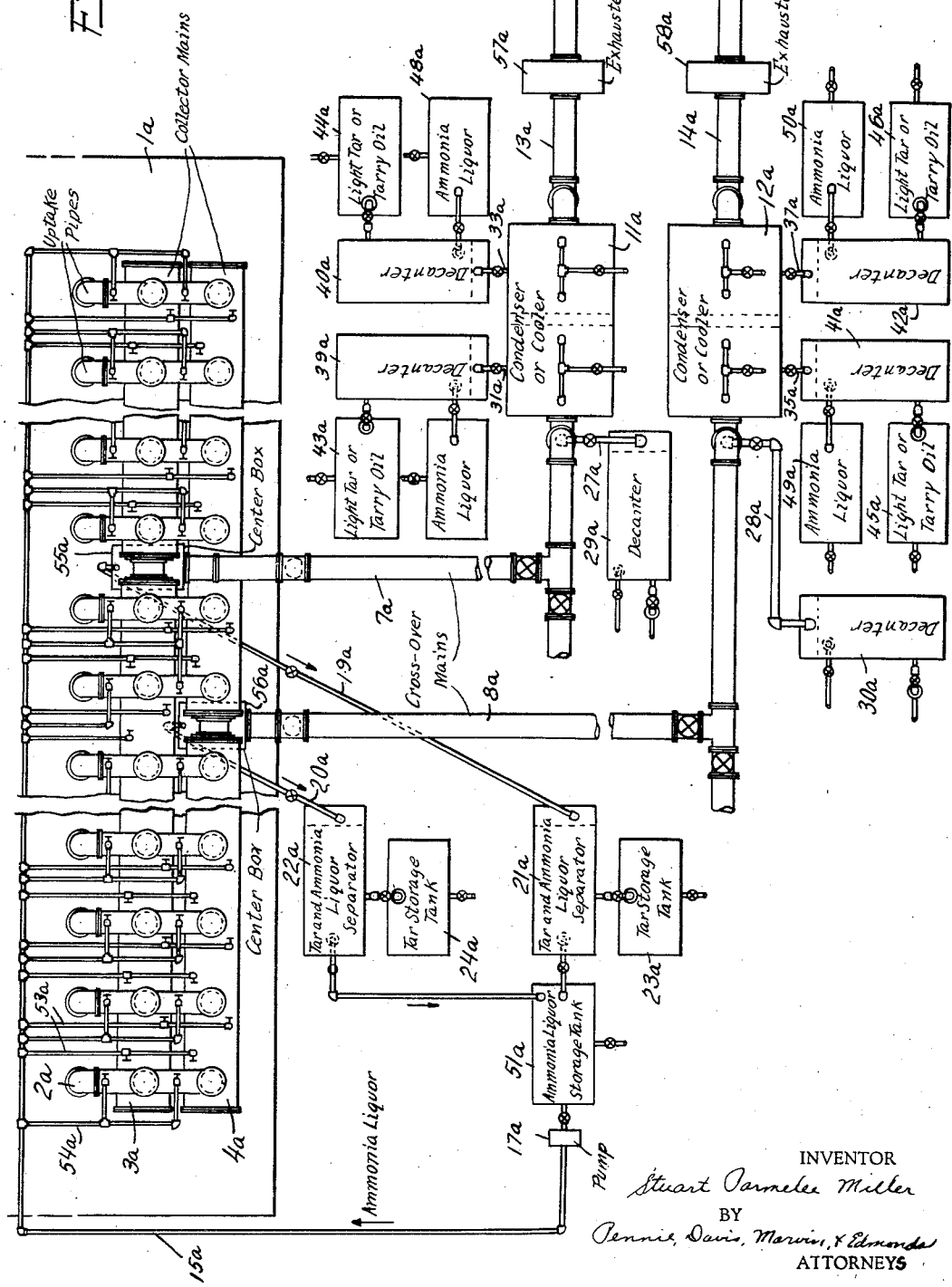

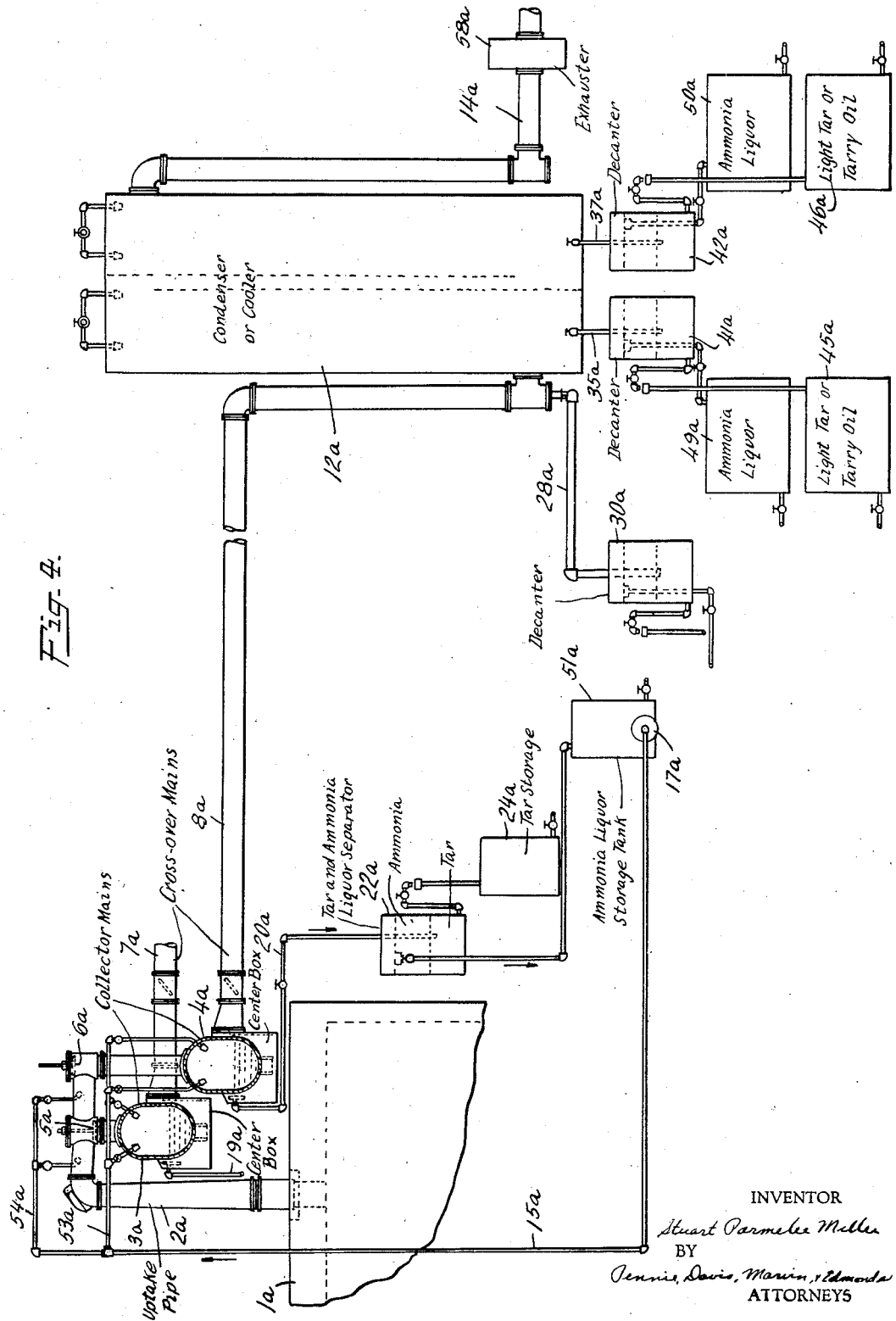

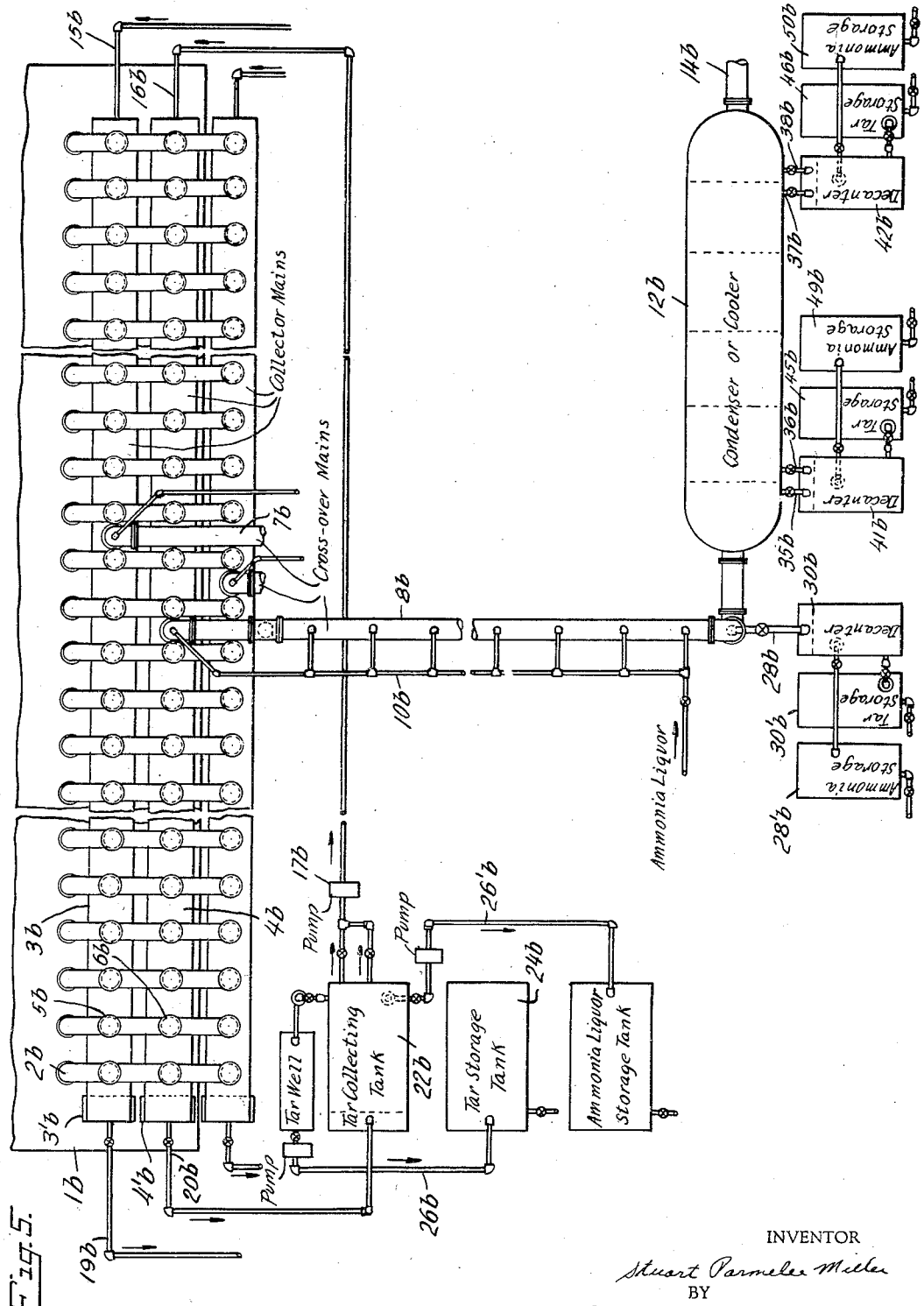

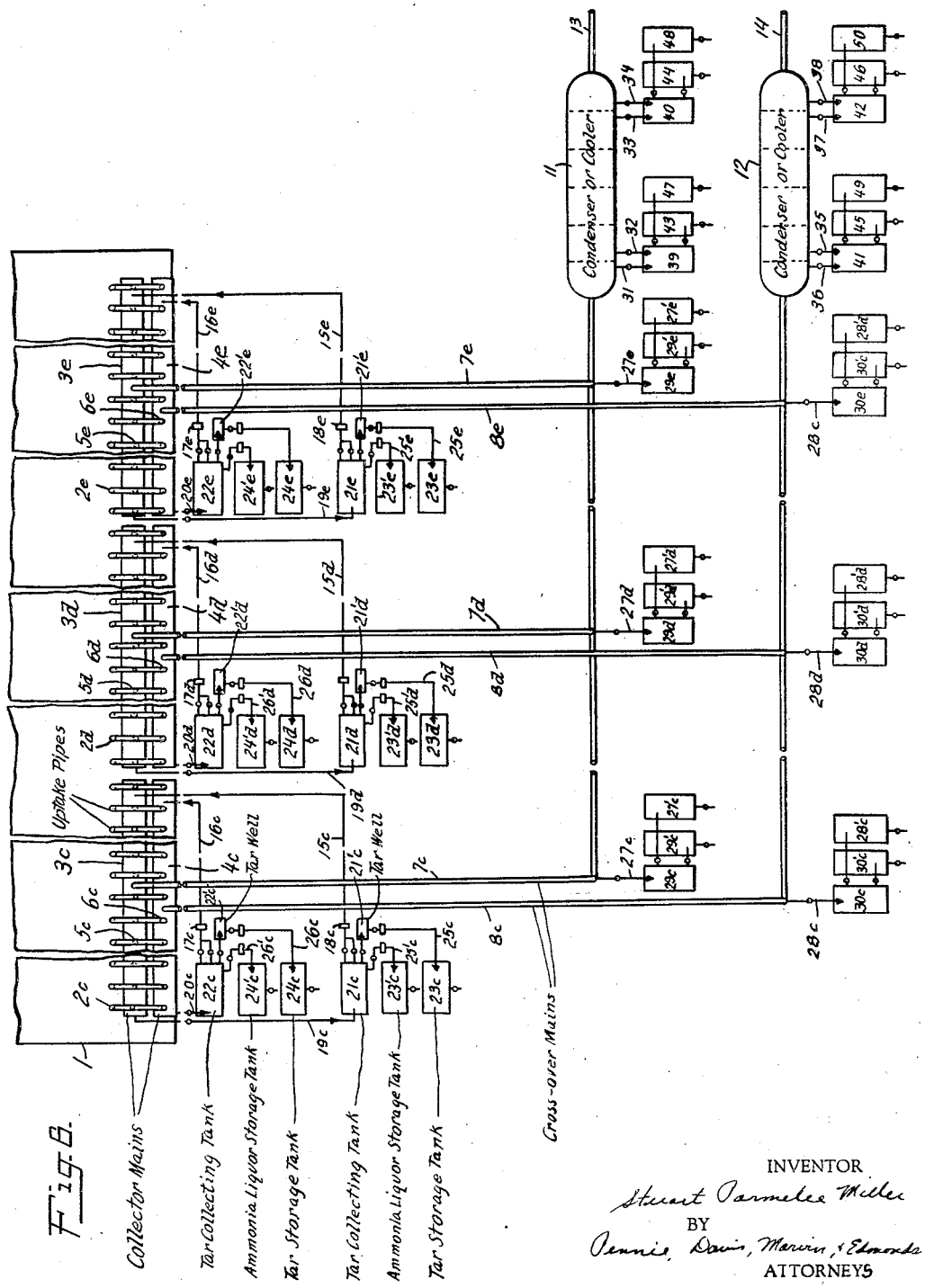

1,844,894

UNITED STATES PATENT OFFICE

STUART PARMELEE MILLER, OF ENGLEWOOD, NEW JERSEY, ASSIGNOR TO THE BARRETT COMPANY, OF NEW YORK, N. Y., A CORPORATION OF NEW JERSEY

OPERATION OF BY-PRODUCT RECOVERY SYSTEMS

Application filed December 29, 1927. Serial No. 243,303.

This invention relates to the operation of coal distillation by-product systems, and more particularly to the production, at coke oven and other coal distillation plants, and in the by-product recovery systems of such plants, of special tars having special properties adapting them for use for special purposes.

In the operation of coke oven and other coal distillation by-product plants it is customary to cool the gases rapidly in the collector or hydraulic mains, in the crossover or foul gas mains and in the condensers to separate the tar therefrom. A considerable part of the tar is thrown down as a heavy tar in the collector or hydraulic mains, while the remainder of the tar, usually a lighter tar or tarry oil, is thrown down in the condensers. These tars are commonly mixed together and shipped to tar distillation plants for distillation.

It has been recognized that the gases produced at coke oven plants during the early period of the coking operation, after the removal of tar therefrom in the collector and cross over mains and in the condensing system, are richer in illuminants and higher in calorific value, than the gas given off from the coke ovens near the end of the coking operation; and separate "rich" and "lean" gas mains have been provided for the purpose of permitting the rich gas, rich in illuminants and higher in calorific value given off during the early portion of the coking operation, to be collected together and employed, after the separation of tar, as a "rich" illuminating gas or heating gas of high calorific value, and of permitting the "lean" gas from near the end of the coking operation to be collected separately so that it could be employed, after the removal of tar therefrom, as a fuel gas of low B. t. u. value, for example, for reheating the coke ovens. In such two-main systems the heavy tar from the collector mains is collected together, the same as the tar from by-product systems where only a single collector main is provided. So also, the lighter tars or tarry oils from the separate condensers of a two-main system are combined together and with the heavy tar from the collector mains for shipment to tar distillation plants for distillation.

The tar produced at coke oven and other coal distillation plants varies somewhat in character and composition, depending upon such variables as the kind of coal coked, the type of coke oven or retort, the time of the coking operation, etc. In general, coke oven tar is of intermediate character between the high carbon tars produced at horizontal and inclined gas retort plants and the low carbon tar produced at certain vertical retort and low temperature carbonization plants. For certain commercial uses, ordinary coal tar can be directly employed. For other purposes, it is necessary to purchase or obtain other kinds of tar for use either by themselves or in admixture with coke oven tar. Where tars requiring a low viscosity and low carbon content are required, water gas tar, a low carbon low viscosity tar is commonly admixed with coal tar to give a composite tar product of the required properties. So also, where higher carbon tars are required, it is customary to use gas retort tars from horizontal or inclined gas retort plants or to admix such tar with coal tar from coke ovens in proper proportions to give a composite tar of the required carbon content, viscosity and other properties.

The present invention provides an improved method of operation of coke oven and other coal distillation by-product recovery systems whereby tars of special properties can be obtained directly at the coke oven or other plant and particularly tars of low carbon content, and tars of high carbon content. According to the present invention either low carbon tars, lower in free carbon than ordinary coke oven tar, or high carbon tars, higher in free carbon than ordinary coke oven tar, are produced directly in the by-product recovery systems of the coke oven plant, and special low or high carbon tars are produced at other coal distillation plants, such as gas retort plants, etc.

In referring to the content of carbon or free carbon of the tars, I use these terms in their ordinary meaning to indicate the material that appears as an insoluble residue on digestion with benzol or other similar solvent. The so-called free carbon may contain inorganic impurities as well as insoluble hydrocarbons of very high molecular weight.

The invention is based upon the observation that not only do the coal distillation gases, e. g. from coke ovens, after the separation of tar therefrom, change from gases of high illuminating and B. t. u. value to gases of relatively low illuminating value and B. t. u. value, but that the tar separated from the gases changes in character and composition during the coking operation, the tar separated from coke oven gases during the early stages of the coking operation being relatively low in free carbon and relatively low in specific gravity and viscosity, and the tar separated from coke oven gases near the end of the coking operation being higher in free carbon content and in specific gravity and viscosity, than the total or composite tar as ordinarily collected.

According to the present invention, I provide for the separate recovery of tar from the gases during the early portion of the coking operation, where a low carbon tar is desired, or for separate collection of the tar from the gases near the end of the coking operation, where a high carbon tar is desired. For example, by collecting the tar from the rich gases during the first third or quarter of the coking period in a by-product coke oven, a tar of low carbon content is obtained; while by collecting separately the tar from the last quarter of the coking period, a relatively high carbon tar is obtained. Such a low carbon tar, or such a high carbon tar, can readily be obtained by providing two collector mains and condensing systems with separate collecting and storage receptacles for the tars therefrom, and by collecting in one of the main and one of the condensing system the tar from the gases given off during a limited portion of the coking period. If, for example, the coking period is twenty hours, and it is desired to collect the low carbon tar from the gases given off during the first quarter of the coking period, the individual ovens will be connected to the low carbon tar main during the first five hours of operation and with the other mains during the remaining period of operation. Similarly, in order to collect the high carbon tar from the last quarter of the coking operation, the gases will be collected in one main during the first three quarters of the coking period and will then be collected in the low carbon tar main during the last five hours of the coking operation. By varying the time during which the gases are collected in one main or the other, the carbon content and other properties of either the low carbon tar or the high carbon tar can be varied and regulated; but in any event the tar will generally be of lower or of higher carbon content than the total tar collected as a composite product in ordinary coke oven by-product operations.

It is evident that, where a low carbon tar is collected during only a small fraction of the total coking period, or where a high carbon tar is collected during only a short portion near the end of the coking period, the remainder of the tar will represent the tar from the entire remaining period of operation, and may not differ greatly from ordinary coke oven tar, except as the absence therefrom of the low carbon tar or of the high carbon tar, separately collected, will make it of correspondingly higher or lower carbon content.

Where only two collecting mains for the gas and tar are provided, it is possible to make either a high carbon tar, or a low carbon tar, but it is not possible to produce both the highest and the lowest carbon tars at the same time, since all of the tar which is not collected in the low carbon tar fraction or in the high carbon tar fraction must be collected in the remaining collecting system.

Where both high carbon tars and low carbon tars of regulated carbon content are desired from all the ovens at the coke oven plant at the same time, I provide three collecting systems so that I can collect separately the tars from the gases during any desired initial period of operation and during any desired later period of operation, leaving the remaining gases given off during the intermediate period of operation to be separately collected in the third collecting system.

In apparatus for carrying out the present invention I provide not only for the separate collecting of the gases during different periods of the coking operation, but I provide separate tar collecting means, and for separate operation of the gas and tar collecting means, so that the tar from the selected period of operation can be separately collected and kept separate from the other tar. In two-main systems, having two collector mains and two condensing systems, such as have been employed to some extent for producing rich and lean gases, I provide for the separate operation of the collecting mains, and I provide in connection with each main a tar collecting and storage receptacle so that the tar can be separately collected and stored, instead of combining the tar from the different mains into a composite tar product as in the operation of present two-main systems. So also, in addition to providing separate condensers for the lighter tars or tarry oils, I provide separate storage receptacles for the lighter tars or tarry oils so that they can also be kept separate, both from each other and from the heavier tars from the collector mains. These light tars and tarry oils, as well as the heavier tars from the collector mains, vary in composition and properties from the beginning to the end of the coking cycle, the oils given off near the end of the coking period being of materially higher specific gravity than the oils given off during the early portion of the coking operation. By keeping separate the heavy tars from the collector mains and the lighter tars from the condensing systems, both lighter and heavier tars of either low or high carbon content can be directly produced at the coke oven plant. This fractional separation and collection of either the high carbon tar or of the low carbon tar can be carried further by providing, for example, for separately withdrawing and storing the tar from the collector mains, from the end of the cross over mains, and from different stages of the condensers. Such a fractional collection of the respective tars is in some cases advantageous in that it enables tars of a wide range of properties to be produced directly at the coke oven plant.

In systems which have a plurality of rich and lean gas collector mains, from which the rich gases are collected together and the lean gases are separately collected together, and from which the total tar is commonly collected together, I provide for independent regulation and operation of part or all of the individual collector mains, and I provide in connection with each collector main a separate tar draw-off so that the tar may be separately drawn off therefrom and kept separate. For example, in a coke oven plant having sixty coke ovens and having three rich and three lean gas mains, each connected to twenty ovens of the battery, I provide separate draw-off lines for the tar from the separate collector mains so that if desired all of the tar separated from each of the separate collector mains can be drawn off and kept separate. In such a system, one pair of the collector mains can be operated to produce a high carbon tar of regulated high carbon content in one of the mains, leaving the remaining tar to be collected from the other collector main. Another pair of the collector mains can be operated differently to collect in one of them a tar of independently regulated carbon content, leaving the remainder of the tar to be collected in the other main. In this way, three of the collector mains of the same battery may be separately regulated to produce simultaneously tars of regulated high or low carbon content, while the tars collected from the other three collector mains will be the balance of the heavy tar from the remaining period of operation of the ovens. In such a system, with only two condensing systems connected respectively to the three rich and lean gas mains, the lighter tar or tarry oil from the condensing system for the three rich gas mains will be a composite product, and that collected from the three lean gas collector mains will also be a composite product. Operating in this way, it is possible to produce six different kinds of heavy tar from the six collector mains, and two lighter composite tars from the condensing systems; although with condensing systems of the multi-stage type, a plurality of lighter tars or tarry oils can be collected of lighter tars or tarry oils can be collected from the separate stages of each condensing system. In such a system, tars of very high carbon content, as well as tars of low carbon content, can be simultaneously produced; and the different tars can be blended with each other in any desired proportions to give blended tars of regulated intermediate carbon content.

The operation of the different gas and tar collecting systems, according to the present invention, may follow the common practice of operation of coke oven by-product systems having only a single collecting system, or of present two-main systems, except for the provision of separate tar collecting and storing means for the tar from the different systems. In general, the present methods of operation include the throwing down of a considerable part of the tar as heavy tar in the collector mains, amounting to, for example, around 60% of the total tar, and the throwing down of the remainder of the tar or tarry oil in the condensers. The throwing down of the tar in the collector main is accomplished by cooling of the gases therein, in part by radiation, and in part by the introduction of tar or ammonia liquor or both. The gases then pass from the collector main through the cross over main in which they may be further cooled by radiation or by the introduction of cooling liquor, and they then pass to the condensers which may be either of the direct or indirect type, and in which the gases are cooled to complete the separation of tar therefrom so far as possible. Thereafter the gases pass through the ammonia recovery system, and they may also pass through light oil recovery systems for the recovery of light oils. The process of the present invention can be carried out in a similar manner, except for the provision of separate gas and tar collecting systems for collecting separately the tar from the gases during different periods of operation.

In present two-main systems of the Semet-Solvay type, in which ammonia liquor in large amounts is introduced into the collector main to cool the gases and to flush the main, I provide separate decanters or tar collecting receptacles and storage tanks for the tar thrown down in the different mains, instead of collecting the tar from both mains together, as in present practice; and I also provide separate collecting and storage receptacles for the tarry oils from the condensers of the two systems.

In present two-main systems of the Koppers type, in which tar is circulated through the collector mains, or a mixture of tar and ammonia liquor, I provide separate and independent tar circulating systems for the two mains, so that there may be recirculated through each main tar of the character separated from the gases in that main, instead of collecting the tar from both mains together and circulating this composite tar through each of the mains, as in present practice. I also provide separate collecting and storage means for the lighter tars or tarry oils from the condensers, instead of combining these with each other and with the heavier tar, as in present practice.

The tars produced according to the present invention, although produced from coke oven or other coal distillation gases, differ materially from the total or composite tar collected from the same gases. The low carbon tars from coke oven gases resemble water gas tar in some of their properties, or blends of water gas tar with coke oven tar. The new high carbon tars from coke oven gases resemble in some respects high carbon gas retort tar, or blends of such tar with coke oven tar. For example, certain road making operations require a tar which is low in carbon and low in viscosity, and ordinarily coke oven and water gas tars are blended to make a composite tar for that purpose, using, for example, 30 to 40% of water gas tar in the blended product. The present invention enables low carbon and low viscosity tar to be directly produced at the coke oven plant, without requiring the purchase or shipment and blending of water gas tar. Similarly, high carbon tars such as have heretofore been produced by blending high carbon gas retort tar with coke oven tar, can be directly produced from the coke oven gases according to the present invention. The tars produced from horizontal or inclined gas retort plants will differ from ordinary high carbon tars from such plants by being lower and higher in free carbon content, and will differ in other properties, such as specific gravity, etc. The lower carbon tars separated from horizontal gas retort gases during the early part of the coking or gas making period will be relatively low in free carbon, and will more nearly resemble coke oven tar, while the tar separated from the gases during the latter part of the gas making operation will be unusually high in free carbon, and will differ in other properties.

Different kinds of tar can also be separated from other types of gas retorts, such as intermittent vertical retorts employed for gas manufacture. Low carbon tars will be obtained from the gases during the early period of operation and high carbon tars during the later period.

These tars, because of their different properties are useful for purposes for which the total composite tar, as commonly produced is not suitable.

The high carbon tars and the low carbon tars may themselves be sold or employed for purposes where high carbon or low carbon tars are required; and the carbon content and certain of the other properties of the tars can be regulated and controlled by varying the period during which the tars are separated from the gases, and by varying the fractional condensation of the tars, for example, to obtain heavier or lighter tars in the collector mains or condensing systems. The heavy tar from the collector mains of coke oven plants can itself be kept separate and separately sold or used; and the lighter tars from the condensing systems can likewise be separately sold or employed; or the heavy tar and lighter tar from the same gases can be blended in different proportions to give a composite tar containing a higher or lower oil content.

The high carbon tars from near the end of the coking cycle are higher in specific gravity, and the lighter high carbon tars, with their higher specific gravity oils, form valuable products for use in making creosoting compositions where high gravity is desired. The lighter tar or tarry oil, for example, from the condensers, or from one or another of the stages of the condensers, of the high carbon tar system, can be directly employed, without distillation, for blending with distillate oils, etc., in the production of creosoting compositions. The low carbon tar is richer in tar acids, and more valuable where a product high in tar acids is desired, or for the recovery of tar acids therefrom.

The high and low carbon tar products of the present invention are of particular value for the production therefrom, by distillation, of high and low carbon pitches, for example, for the production from coke oven tars of pitches, such as have heretofore been obtained by blending coke oven tar with high or low carbon tar and distilling the mixture, or by blending coke oven pitch with high carbon pitch or low carbon pitch produced from other tars. The distillation of the heavy tar from the collector mains by itself enables a high carbon pitch or a low carbon tar with a minimum of distillation. The separate distillation of the lighter tar or tarry oils from the condensers enables a considerably greater oil yield to be produced from the tar distilled than when the admixed heavy and light tars are distilled together. The distillate from the low carbon tar will be relatively high in tar acids and of relatively low specific gravity; while the distillate from the high carbon tar will be lower in tar acids and of higher specific gravity. I do not however, claim herein the distillation of the new low carbon and high carbon tars, inasmuch as this forms the subject matter of companion applications Serial Nos. 243,305 and 243,307, both filed December 29, 1927.

The invention will be further described in connection with the accompanying drawings which illustrate, in a conventional and diagrammatic manner, coke oven plants suitable for the practice of the invention.

In the accompanying drawings,

Fig. 1 is a plan view of part of a coke oven plant, with parts broken away, showing the by-product recovery system, the coke oven plant being of the Koppers type in which tar and ammonia liquor are circulated through the collector mains.

Fig. 2 is an elevation in development showing part of the plant of Fig. 1.

Fig. 3 is a plan view showing a coke oven plant of the Semet-Solvay type in which ammonia liquor is sprayed into the collector mains.

Fig. 4 is an elevation in development of part of the coke oven plant and by-product recovery system of Fig. 3.

Fig. 5 is a plan view showing a three main system with three separate tar collecting and condensing systems, and Fig. 6 is a simplified plan view showing a six-main system with provision for independent operation of the six collector mains.

The coke oven plant shown in Figs. 1 and 2 is a plant of the Koppers type in which tar and ammonia liquor are circulated through the collector mains, from one end to the other. The individual coke ovens are indicated conventionally at 1, each oven having an uptake pipe 2 connected with two separate collector mains 3 and 4, each uptake pipe having valves 5 and 6 for connecting the uptake pipe with one or the other of the collector mains. Cross over mains 7 and 8 lead from each of the collector mains to the condensers, and each cross over main is shown as provided with spray pipe indicated at 9 and 10 for introducing ammonia liquor into the gases passing through the cross over main.

The condensers or coolers 11 and 12 are of the indirect type, and are multiple pass condensers in which the gases are brought into indirect contact with the cooling water in a series of stages. The gases pass from the condensers through gas outlets 13 and 14 to exhausters and to the ammonia recovery system (not shown).

The collector mains 3 and 4 have inlet lines 15 and 16 supplied with admixed tar and ammonia liquor, by means of pumps 17 and 18. At the other end of the collector mains are located tar and ammonia liquor outlet lines 19 and 20 which lead from tar traps 3' and 4' to tar collecting tanks 21 and 22 from each of which the required ammonia liquor and tar may be pumped back by means of the pumps 17 and 18 through the inlet lines 15 and 16 to the collector mains. The excess tar is separated and collected in tar wells 21' and 22' and pumped through the lines 25 and 26 to the tar storage tanks 23 and 24. Excess ammonia liquor is stored in tanks 23' and 24'. The arrangement is such that the tar collected from each collector main is returned to the same collector main so that only tar of the character separated from the gases in each main is admixed with the further tar separated in the main, thus keeping the respective tars entirely separate from each other.

In such a system, the gases may leave the collector mains at a relatively high temperature, and may be cooled in the cross over mains by introducing ammonia liquor sprays. The tar or tarry oils thrown down in the cross over mains, together with the ammonia liquor, can be collected through tar lines 27 and 28 located at the ends of the cross over mains, and before the gases enter the condensers, these lines leading to decanters, or tar and ammonia liquor separating tanks 29, and 30, from which the tar and ammonia liquor may be separately drawn off to storage tanks 29' and 30', and 27' and 28'.

The light tar or tarry oil thrown down in the condensers is drawn off through outlets 31 to 38 inclusive into decanters, or tar and ammonia liquor separating tanks, 39, 40, 41 and 42, from which the light tar or tarry oil is collected in storage tanks 43, 44, 45 and 46 and the ammonia liquor in tanks 47, 48, 49 and 50. This arrangement is such that a fractional condensation of the light tar or tarry oils is obtained, and two fractions drawn off from each of the indirect condensers, and each of these products is kept separate from the others, thereby giving four separate products from the two condensers, in addition to the two products obtained from the collector mains, and the two products obtained from the cross-over mains, making a total of eight products separately collected, four from each of the collecting and condensing systems. The condensers shown are of six passes each. If desired each pass may be equipped for separate withdrawal of tarry oil and ammonia liquor. From each condenser six separate fractions can be collected. Separate decanters will be required. Each fraction may be left separate or the fractions may be blended among themselves or with other tars or tarry oils to produce the desired product.

In the operation of such a by-product recovery system, the valves 5 and 6 will be opened and closed to permit the gas given off from each oven during a certain period of the coking operation to be collected in one or the other of the collector mains. If, for example, it is desired to collect the gases from the first third of the coking operation in the collector main 3 and the connected condensing and collecting system, the valve 5 will be opened and the valve 6 closed during the first period of the coking cycle of each oven, and the valve 5 will then be closed and the valve 6 opened during the remaining two-thirds of the coking period, so that the gases from the first third of the coking period will be collected in the collector main 3 and the gases given off during the last two-thirds of the coking period will be collected in the collector main 4. Similarly, if, for example, the gases from the last third of the coking period are to be selected to give a high carbon tar in the collector main 4, the valve 5 will be opened during the first two-thirds of the coking period and the valve 6 will be opened during the last third of the coking period, thereby collecting all of the gases during the first two-thirds of the coking operation in the collector main 3, and during the last third of the coking operation in the main 4. For obtaining the lowest carbon tars, only a small portion of the initial period of coking of each oven will be selected for collecting the gases in the low carbon tar main 3; while if only the highest carbon tars are desired, only a small portion of the coking operation at the end of the coking cycle will be selected for collecting the gases in the high carbon main 4. It will be evident that higher or lower carbon tars can be obtained by increasing or decreasing the relative portions of the coking period during which the gases are collected in either the low carbon tar system or the high carbon tar system.

When low carbon tar is collected in the collector main 3 and from the cross over mains 7 and condensers 11, the heavy tar from the collector main, which is usually admixed with a large excess of ammonia liquor, will be collected in the tank 21 and will in part be pumped together with ammonia liquor by the pump 18 through the line 15 to the main 3. Low carbon tar with ammonia liquor will thus be returned and circulated through the main in which low carbon tar is separated from the gases, thereby insuring that the low carbon tar is not contaminated with high carbon tar. Similarly the high carbon tar thrown down from the gases in the high carbon tar main 4 is collected in the tank 22 and is in part pumped back with a large excess of ammonia liquor by the pump 17 through the line 16 to the high carbon main, so that only high carbon tar and ammonia liquor is circulated through the main in which high carbon tar is thrown down from the gases.

The tar recovered from the collector mains, in such a system, will be a relatively heavy tar, and can be employed directly for certain purposes where a heavy tar of either high carbon content or low carbon content is desired. Similarly, the light tar or tarry oil thrown down in the condensers can be employed separately, or shipped separately or blended to a greater or less extent with oils or other products, or even with the heavy tar, to give blended products. In some cases, the total tar, from both the collector and cross over mains and condensers can be combined to give a total high carbon tar, or a total low carbon tar; or these separate products can be separately employed or shipped or subjected to distillation for the production therefrom of various products.

The coke oven illustrated in Figs. 3 and 4 is of the Semet-Solvay type in which ammonia liquor is sprayed into the gases in the collector main and in the pipes leading to the collector main. Similar parts of the coke oven by-product recovery system are indicated by the same reference characters as in Figs. 1 and 2 but with the letter "a" appended thereto. The ammonia liquor sprays in the cross over main are in this case omitted and the circulation of tar through the collector mains is also omitted, and, instead, ammonia liquor is recirculated and sprayed into the mains, and the admixed tar and ammonia liquor drawn off from the respective mains are separately treated for the separation of the ammonia liquor from the tars, and the ammonia liquor is then in part recirculated.

The collector mains 3a and 4a of Figs. 3 and 4 have ammonia liquor supplied thereto through the pipe 15a and branch pipes 53a and 54a, the branch pipe 54a discharging ammonia liquor into the pipes leading to the collector mains to keep the valves washed, and the branch pipe 53a discharging ammonia liquor directly into the collector mains. The admixed ammonia liquor and tar collects in the center boxes 55a and 56a and is drawn off through the lines 19a and 20a to the decanters or tar and ammonia liquor separator tanks 21a and 22a. In these tanks the tar separates from the ammonia liquor and the tar is collected in the tar storage tanks 23a and 24a while the ammonia liquor is collected in the tank 51a and is in part pumped back through the pump 17a and the line 15a to the collector mains. In this system it will be seen that the ammonia liquor, after it has been separated from the tars, is combined and in part returned through the same ammonia liquor circulating system, common to both mains, while the tars drawn off from the respective mains is kept separate and collected in separate storage tanks, instead of being combined as in present day practice. The tars and ammonia liquor thrown down in cross-over mains 7a and 8a can be collected and separated in decanters 29a and 30a.

The condensers shown in Figs. 3 and 4 are of the direct type in which water or ammonia liquor is sprayed directly into the gases to bring about cooling and separation of tar therefrom. Provision is made for drawing off tar and liquor from each of the two condensers at each of two places, thus obtaining a fractional condensation of tar or tarry oils in the condensers. The light tars or tarry oils drawn off together with the ammonia liquor through the outlet pipes 31a, 33a, 35a and 37a passes to decanters or tar and ammonia liquor separators 39a, 40a, 41a and 42a in which the tars are separated from the ammonia liquor and the tars thus separated can be drawn off into separate storage tanks, the ammonia liquors can be combined if desired although I show separate tanks in Fig. 3.

Part of the ammonia liquor thus separated from the light tar can be recirculated through the condensers and part can be drawn off for the recovery of ammonia therefrom.

The gases after leaving the condensers 11a and 12a of Figs. 3 and 4 pass through the outlet gas lines 13a and 14a to exhausters 57a and 58a and then to ammonia and light oil recovery systems (not shown).

The gases from the respective systems of the present invention may be kept separate or may be admixed with each other. The gases from either the low carbon tar systems or the high carbon tar system will in general be rich and lean gases, but the richness or leanness of the gases will be incidental to the production of the low carbon tar, or high carbon tar, and the operation will not be regulated from the standpoint of the richness or leanness of the gas from which the tar has been separated, as in present practice with two-main systems.

If only a low carbon tar or a high carbon tar is desired, the remainder of the tar can be collected as a composite tar, but if both a low carbon tar and a high carbon tar is desired, lower and higher respectively than tars obtainable in a two-main system, a three-main system can be employed or a system with more than three mains where several tars are sought. In such a three-main system, it is possible to collect the gases from any desired initial period of operation, and from any desired final period of operation, thereby obtaining low carbon tars and high carbon tars of regulated carbon content independently of each other, and throwing all of the gases from which tars of intermediate character are recovered into the third main. In such a system it is possible to obtain both the highest and the lowest carbon tars simultaneously. A system suitable for this purpose is illustrated conventionally in Fig. 5, the same reference characters being employed as in Figs. 1 to 4 for two of the three mains but with the letter "b" appended thereto and only one condensing system being shown for convenience of illustration. The third collector main, is left without reference characters, but the construction and operation is the same as with the two main systems of Figs. 1 to 4 except for the provision of a third main and third system into which the gases can be diverted and from which the tar can be recovered, during such portion of the coking operation as the gases are not desired for the separation of low carbon tar and high carbon tar therefrom. The three collector mains and condensing systems are shown as arranged on the same side of the battery, but where there is not room for a third collector main alongside the other two mains, this can be located at the back of the battery.

With such a three-main system, it is possible to recover directly from coke oven gases tars of high carbon, low carbon and intermediate carbon content, with other properties possessed by the respective high, low, or intermediate carbon tars. With such a three-main system, it is also possible to collect from each of the three systems, heavy and light tar products. As in the by-product recovery systems of Figs. 1 to 4, four separate products can be collected from each system, or twelve separate products from a three-main system, and, since these respective products can be somewhat varied and regulated by varying the period during which the gas is collected in each system or by varying the temperature of each system, it is possible to obtain and collect separately a large number of different coal tar fractions at a coke oven plant, which fractions may be employed for different purposes, or for blending together or with other oils or tars as in the two main systems described, so in the multiple main system the condensers of the indirect type may be equipped for withdrawal of several individual fractions, this making possible the collection of a very large number of fractions when desired. In this way, it is possible to produce directly at a coke oven plant products having physical properties which have heretofore been characteristic only of tars from other tar plants, such as water gas tar plants, or horizontal gas retort plants. It is also possible to produce special products which can be blended in making special tar products or which can be used directly as tar products, or which can be combined with distillate oils to form commercial creosoting compositions, etc.

In Fig. 6, which is a simplified drawing with parts omitted, the corresponding parts are indicated by the same reference numerals as in the preceding figures, but with the letters a, b, or c, appended thereto. In this case, the coke oven block or battery is divided up into three sections and each section has two collector mains connected with each of the ovens thereof so that, in each section, either main can be connected to the ovens of that section during any desired initial or final period of the coking operation. Instead of collecting the tar from all of the six collector mains together, I provide for collecting separately the tars from these mains, thereby obtaining six separate tar products from the six mains. In one section, one of the collector mains can be regulated to separate from the gases a heavy tar of low carbon content from a regulated initial portion of the coking period in the ovens, leaving the remainder of the gases to pass to the other main connected to the same ovens during the remaining portion of the coking period. In another section of the plant, one of the collector mains can be operated to obtain therein a heavy high carbon tar from the gases given off during a regulated later portion of the coking period, leaving the gases from the earlier period to be collected in the other collector mains.

In the operation of such a six main system, three of the mains can be independently operated to separate therein either high carbon tar or low carbon tar of regulated high carbon or low carbon content, by regulating the portion of the coking operation during which the gases are collected in such mains. In addition, the tars separated from the gases in the remaining three mains will also vary in carbon content. Six different tars can thus be obtained simultaneously from the six collector mains. In addition, lighter tars will be obtained in the two condensing systems, each of which is connected with three of the collector mains, and, in a fractional or sectional condenser, the lighter tar or tarry oil can be obtained in a series of fractions differing somewhat from each other. These various lighter tars and tarry oils, as well as the series of heavy tars from the collector mains, can be blended together in various combinations and proportions to give a wide range of products of intermediate carbon content, thus making it possible to produce tars meeting certain specifications, or to produce pitches of regulated carbon content by distillation of the tars, as described in my companion applications Serial Nos. 243,305 and 243,307.

The temperature of the gases passing through the collector mains can be controlled to a greater or less extent by regulating the amount of ammonia liquor introduced therein, and in this way tars of somewhat heavier or lighter character can be separated in the collector mains, and a greater or smaller amount of the oils can be thrown over in vapor form to the condensers. In this way, also, the character of the products recovered in the different parts of each system can be somewhat regulated.

While the invention has been more particularly described in connection with coke oven plants and the production of special coke oven tars, for which it is particularly valuable, yet in its broader aspects it includes the production of special high and low carbon tars in a similar manner from other coal distillation gases, such as gas retort gases, where special tars of unusually low or high carbon content can be produced.

It will thus be seen that the present invention provides for the direct production, at coke oven or other coal distillation plants, of special tar products, particularly high carbon tars and low carbon tars of special properties, which form valuable new tar products, adapted for use for purposes for which other tars have heretofore been employed, and adapted for use of the production of special products, such as special pitches, therefrom.

I claim:—

1. The method of producing high free carbon and low free carbon tars at coke oven plants, which comprises separately collecting in separate collector mains the gases from the early stages of the coal distillation and the gases from the later stages of the coal distillation, separately cooling such gases by the introduction of ammonia liquor therein, while in the collector mains, drawing off from the collector mains the low free carbon tar and high free carbon tar separately with admixed ammonia liquor, separating the ammonia liquor from the respective tars, and keeping the resulting tars separate from each other.

2. The method of producing high free carbon tar and low free carbon tar at coke oven plants, which comprises collecting separately in separate collector mains the gases from the early stages of the coal distillation and the gases from the later stages of the coal distillation, cooling the gases in the respective collector mains to separate tar therefrom, collecting the low free carbon tar and high free carbon tar respectively from the two mains and keeping such tar separate, and recirculating through each main tar of the character separated from the gases in such main.

3. The method of recovering tars of different characteristics at coke oven plants, which comprises collecting separately in separate collector mains and condensing systems the gases from the early stages of the coal distillation and the gases from the later stages of the coal distillation, separately cooling the respective gases to separate therefrom first a heavy tar and then a light tar, keeping the respective heavy and light tars separate from each other, and circulating through the respective collector mains tar of the character separated from the gases in such mains.

4. The method of producing high free carbon, low free carbon and intermediate free carbon tars at coke oven plants, which comprises separately collecting in separate collector mains the gases from early, intermediate and later stages of the coal distillation, separately cooling the gases in each of said collector mains to separate tar therefrom, and separately drawing off and keeping separate the respective high free carbon, intermediate free carbon and low free carbon tars separated from the gases in the respective collector mains.

5. The method of producing tars of different characteristics at coke oven plants, which comprises separately collecting in separate collector mains the gases from the early, intermediate and later stages of the coal distillation, separately cooling the gases in each of said collector mains to separate tar therefrom, and separately drawing off and keeping separate the respective high carbon, intermediate carbon and low carbon tars separated from the gases in the respective collector mains and subjecting the respective gases from the respective collector mains to further cooling in separate condensing systems and separately collecting and keeping separate the light tars or tarry oils separated from the gases in the respective condensing systems.

In testimony whereof I affix my signature.

STUART PARMELEE MILLER.